(12) United States Patent
Rohillah et al.

(10) Patent No.: US 11,886,354 B1
(45) Date of Patent: Jan. 30, 2024

(54) CACHE THRASH DETECTION

(71) Applicant: Apple Inc., Cupertino, CA (US)

(72) Inventors: Anwar Q. Rohillah, Dublin, CA (US); Tyler J. Huberty, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/664,379

(22) Filed: May 20, 2022

(51) Int. Cl.
*G06F 12/128* (2016.01)
*G06F 1/3225* (2019.01)
*G06F 12/0891* (2016.01)

(52) U.S. Cl.
CPC .......... *G06F 12/128* (2013.01); *G06F 1/3225* (2013.01); *G06F 12/0891* (2013.01); *G06F 2212/1021* (2013.01)

(58) Field of Classification Search
CPC .. G06F 12/128; G06F 1/3225; G06F 12/0891; G06F 2212/1021
See application file for complete search history.

(56) References Cited

U.S. PATENT DOCUMENTS

| | | | | |
|---|---|---|---|---|
| 2009/0037664 A1* | 2/2009 | Kornegay | ........... | G06F 12/0888 711/138 |
| 2012/0041914 A1* | 2/2012 | Tirunagari | ............ | G06F 12/121 706/15 |
| 2014/0101388 A1 | 8/2014 | McCauley | | |
| 2017/0357588 A1 | 12/2017 | Moyer | | |
| 2019/0243783 A1 | 8/2019 | Lewis et al. | | |
| 2023/0121686 A1* | 4/2023 | Bondarenko | ....... | G06F 12/0238 711/118 |

OTHER PUBLICATIONS

"Adaptive Insertion Policies for High Performance Caching," Moinuddin K. Qureshi, et al., ECE Department, The University of Texas at Austin and Intel Corporation, VSSAD, Hudson, MA, ACM 978-1-59593-706-3/07/0006, Jun. 9-13, 2017, 11 pages.

* cited by examiner

*Primary Examiner* — Gurtej Bansal
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to cache thrash detection. In some embodiments, cache controller circuitry is configured to monitor and track performance metrics across multiple levels of a cache hierarchy, detect cache thrashing based on one or more performance metrics, and modify a cache insertion policy to mitigate cache thrashing. Disclosed techniques may advantageously detect and reduce or avoid cache thrashing, which may increase processor performance, decrease power consumption for a given workload, or both, relative to traditional techniques.

20 Claims, 7 Drawing Sheets

CACHE THRASH DETECTION

BACKGROUND

Technical Field

This disclosure relates generally to computer processors and more particularly to mitigating cache thrashing.

Description of the Related Art

Cache thrashing is caused when a data set being operated on is too large to fit in the cache and some lines are evicted shortly before they are accessed again. Generally, frequent replacement or insertion of cache lines before they are to be used in a process may cause recurring cache misses.

As a specific example, many traditional cache replacement policies track the least recently used (LRU) cache line. When a cache is full and a new line needs to be allocated, the least recently used line is evicted and the new line is typically inserted with an LRU value that indicates it is most recently used (MRU). When working data sets are larger than those that fit in the cache, however, a cache line may become the LRU line and be evicted before it is accessed again (thrashing). Cache thrashing may substantially reduce processor performance for a given workload.

DETAILED DESCRIPTION

In disclosed embodiments discussed in detail below, a computing device is configured to detect cache thrashing at one or more levels of a cache hierarchy and change the insertion policy for one or more caches accordingly.

Note that a given cache may be operated using one or more replacement policies to determine which entries to evict to make room for new data. One well-known replacement policy, known as the least-recently-used (LRU) replacement policy, works well for many workloads and may take advantage of temporal locality of accesses. In conjunction with a given replacement policy, various insertion policies may also be implemented. As one example, for a cache with an LRU or pseudo-LRU replacement policy, new entries are typically inserted with a most recently used (MRU) status.

When working data sets are larger than those that will fit in the cache, traditional LRU replacement and insertion of fills at the MRU may cause cache lines to be evicted and then accessed again within a fairly short interval, which is referred to as thrashing. The cache miss for an access after eviction may incur a performance and power penalty when retrieving the data from a slower cache or memory, relative to cache hits when thrashing does not occur.

In some embodiments, a cache controller is configured to track one or more performance metrics across multiple levels of a cache hierarchy to detect cache thrashing. The cache controller may change the cache insertion policy based on such detection, e.g., to reduce or avoid thrashing. One non-limiting example metric is hit rate, which may be tracked for multiple cache levels.

In various embodiments, disclosed techniques may effectively detect thrashing and may advantageously control retention of cache lines to mitigate thrashing, which may in turn improve processor performance, reduce power consumption for a given set of processing work, or both. For example, inserting some lines at LRU instead of MRU may cause those lines to be evicted quickly but allow other lines to remain in the cache longer, so that subsequent accesses are more likely to hit the remaining lines.

Overview of Processor Circuitry

Figure 1:
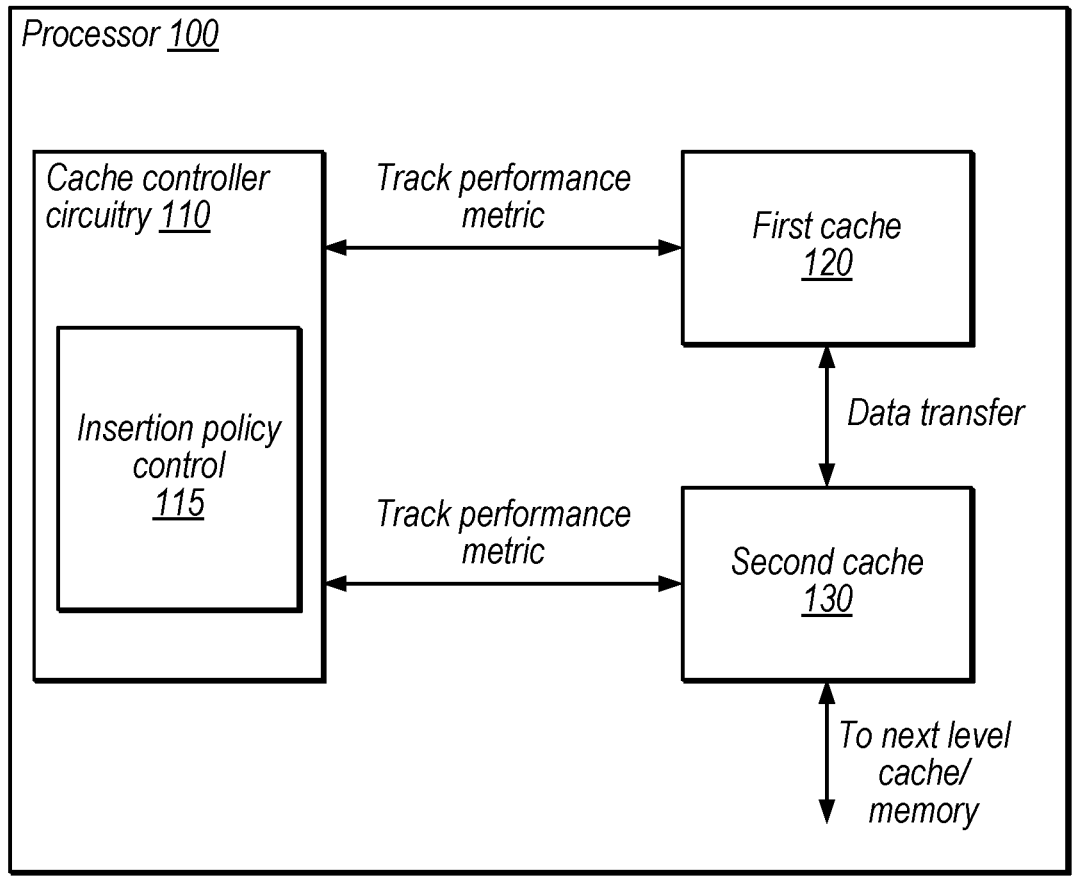
FIG. 1 is a block diagram illustrating an overview of example cache thrash detection circuitry, according to some embodiments.

FIG. 1 is a block diagram illustrating an overview of example cache thrash detection circuitry, according to some embodiments. The illustrated embodiment includes a processor 100. Processor 100, in turn, includes cache controller circuitry 110, first cache circuit 120, and second cache circuit 130. Cache controller circuitry 110, in turn, includes insertion policy control circuit 115. In the illustrated embodiment, cache controller circuitry 110 is connected and configured to control first cache 120 and second cache 130.

Processor 100 may be configured to execute program instructions to perform various operations. For example, processor 100 may include execution pipeline circuitry (not shown) that may access data in one or more caches or memory. Note that instructions may also be cached in one or more cache levels in dedicated or shared caches.

In the illustrated example, first cache 120 is an inner-level cache (architecturally nearer to execution circuitry) relative to second cache 130. Second cache 130 is also configured to cache data from one or more outer-levels (architecturally further from execution circuitry) in the cache/memory hierarchy.

Cache controller circuitry 110, in the illustrated embodiment, is configured to manage the retrieval, storage, and delivery of data to and from various levels of the cache and memory hierarchy. In some embodiments, cache controller circuitry 110 includes insertion policy control 115 that receives various performance metrics, as discussed in detail below, from first cache 120 and second cache 130. The cache controller circuitry 110 may implement any of various appropriate replacement and insertion policies. For age-based schemes (e.g., LRU or pseudo-LRU), the cache controller circuitry may maintain a data structure (e.g., a tree) used to determine relative recency-of-access of different cache lines. This information may be used to determine which lines to evict.

Insertion policy control 115, in the illustrated embodiment, is configured to control the cache insertion policy for at least one of the first cache 120 and second cache 130. The insertion policy indicates the retention priority of cache lines when they are allocated cache entries. Insertion policy control 115 may implement one or more of the following types of insertion policies, without limitation: MRU insertion policy, LRU insertion policy, bimodal insertion policy, dynamic insertion policy, etc. Insertion policy control 115 may switch between insertion policies at a given cache level based on at least the various performance metrics. In other embodiments, any of various appropriate insertion policies may be implemented.

In some embodiments, the MRU insertion policy places a given incoming line at the MRU position of a cache and is typically associated with the commonly used LRU replacement policy. For workloads that have a working set greater than the available cache size, such a policy is susceptible to thrashing. In some embodiments, such workloads are often victim to being placed in the MRU position of a cache and being adjusted from the MRU position to the LRU position without ever receiving a cache hit. In such situations, the use of other insertion policies may advantageously mitigate thrashing.

In some embodiments, the LRU insertion policy places all incoming lines in the LRU position of a cache. While incoming lines are inserted at the LRU position, these lines may be promoted from the LRU position to the MRU position (or some position in between) if they are referenced while in the LRU position. Generally, the LRU insertion policy is a policy that may reduce cache thrashing for workloads with working sets greater than the size of the cache and for workloads that have a cyclic access pattern. Specifically, lines inserted at LRU may be quickly evicted (unless they are accessed in quick succession), but this may allow other lines that were accessed in quick succession to remain in the cache rather than thrashing.

In some embodiments, the bimodal insertion policy is similar to the LRU insertion policy except that, in certain scenarios, it may place a given incoming line at the MRU position of a cache. Generally, the bimodal insertion policy is able to adapt to changes that occur to the size of the working set, e.g., in order to sustain the cache thrashing protection that the LRU insertion policy offers.

In some embodiments, the dynamic insertion policy dynamically adjusts the insertion policy of the cache to either follow the traditional LRU insertion policy or the bimodal insertion policy, e.g., based on which is estimated to perform better in a current operating scenario.

In some embodiments, insertion policy control 115 receives, via cache controller circuitry 110, various performance metrics from first cache 120 and second cache 130.

In some embodiments, the various performance metrics received by insertion policy control 115 may include, without limitation: hit rate, hit count, miss rate, miss count, number of evictions, cache occupancy, number of tag checks, etc.

In some embodiments, insertion policy control 115, in response to receiving a performance metric from first cache 120 that does not meet a first threshold and a performance metric from second cache 130 that meets a second threshold, may change the insertion policy of at least one of the first cache 120 and second cache 130. The thresholds for the different caches may be different.

As one example, in response to the hit rate of first cache 120 not meeting a first threshold and the hit rate of second cache 130 meeting a second threshold over an interval (e.g., a set of cycles), insertion policy control 115 may change the insertion policy of first cache 120 from the MRU insertion policy to the LRU insertion policy for a subsequent interval. In particular, this may indicate a situation where the size of the data set being operated on fits in the outer-level second cache 130 (which is typically larger than inner-level caches) but does not fit in the first cache 120. In this case, switching to the LRU insertion policy (or some other policy) may reduce thrashing in the first cache 120.

This disclosure refers to insertion policy control that may change the cache insertion policy based on various performance metrics. This change of policy is described herein as being based on one or more performance metrics "meeting" or "not meeting" one or more thresholds. As used herein, the terms "meets" or "does not meet" refer to tests for meeting a threshold in opposite directions, but specific directions are not implied. For example, the present disclosure describes that one possible performance metric for changing a cache insertion policy is the "hit rate" of the cache. Thus, in one implementation, a policy change might occur based on a hit rate for a first cache being less than (or less than or equal to) a particular value. But in another implementation, whether a policy change is to be made might be based on the "miss rate" for the first cache (which is equal to 1-hit rate) being greater than (or greater than or equal to) the particular value. Accordingly, to provide the greatest breadth of scope for implementations described herein, the present disclosure refers to a value that "meets" or "does not meet" a "threshold." This avoids a formulation that is made in only one "direction." For example, if an implementation were described and claimed as making a insertion policy change based only on a particular value being greater than a particular threshold, an entity seeking to avoid such a limitation might design a system in which the policy change is based on the particular value being greater than or equal to the particular threshold, or in which the policy change is based on the particular value being less than (or less than or equal to) a "negative" version of the particular threshold (e.g., 1−x, where x is the particular threshold). In sum, the formulation of a value that "meets" or "does not meet" a "threshold" is to be broadly interpreted, and, in a particular implementation can constitute one of the following: the value being greater than the threshold, the value being greater than or equal to the threshold, the value being equal to the threshold, the value being not equal to the threshold, the value being less than or equal to the threshold, and the value being less than the threshold.

First cache 120 may utilize a write-through or write-back write policy. In some embodiments, first cache 120 may be the first level cache of processor 100. In other embodiments, first cache 120 may be an outer-level cache of processor 100 and may be on a separate chip than processor 100 itself. In the illustrated embodiment, first cache 120 is configured to send various performance metrics to cache controller circuitry 110. Such performance metrics may include a hit rate, hit count, miss rate, miss count, number of evictions, cache occupancy, number of tag checks, etc. In some embodiments, first cache 120 may send data to and retrieve data from second cache 130.

Second cache 130 may utilize a write-through or write-back write policy. As discussed above, second cache 130 may be an outer-level cache relative to first cache 120. In various embodiments, second cache 130 may be any level cache of processor 100 and may be on a separate chip than processor 100 itself. One or both of the first and second caches 120 and 130 may be private or shared and may be dedicated or unified for instruction and data caching. In the illustrated embodiment, second cache 130 is configured to send various performance metrics to cache controller circuitry 110. Such performance metrics may include a hit rate, hit count, miss rate, miss count, number of evictions, cache occupancy, number of tag checks, etc. In some embodiments, second cache 130 may send data to or retrieve data from first cache 120. Similarly, in some embodiments, second cache 130 may send data to and retrieve data from an outer-level cache or memory.

Example Cache Thrash Detection Circuitry

Figure 2:
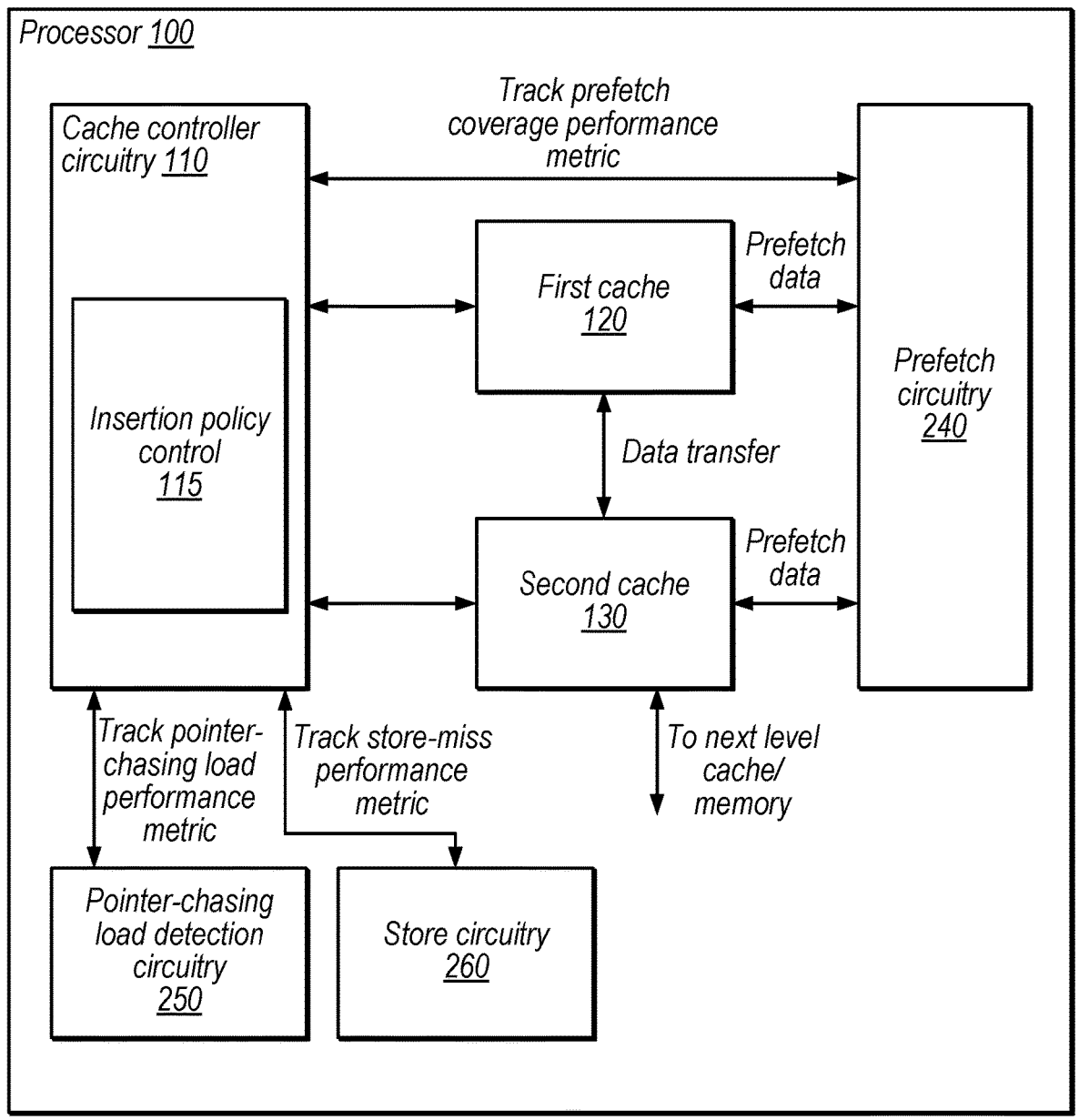
FIG. 2 is a block diagram illustrating example cache thrash detection circuitry that uses additional example metrics, according to some embodiments.

FIG. 2 is a block diagram illustrating example cache thrash detection circuitry that uses additional example metrics, according to some embodiments. In the illustrated embodiment, processor circuit 100 includes cache controller circuitry 110, first cache circuit 120, second cache circuit 130, prefetch circuitry 240, pointer-chasing load detection circuitry 250, and store circuitry 260. Cache controller circuitry 110, in turn, includes insertion policy control circuit 115. In the illustrated embodiment, cache controller circuitry 110 is connected to and configured to control first cache 120 and second cache 130.

In some embodiments, processor 100, cache controller circuitry 110, insertion policy control 115, first cache 120, and second cache 130 are configured in a similar manner as discussed with reference to FIG. 1 above, with additional example functionality described in detail below.

In the illustrated embodiment, cache controller circuitry 110 tracks a prefetch coverage metric for prefetch circuitry 240. In some embodiments, the prefetch coverage performance metric represents the prefetch coverage level for a particular cache and is defined as the ratio of demand misses covered by prefetches from prefetch circuitry 240 over a time interval. Generally, a high demand miss rate indicates that prefetch circuitry 240 is not efficiently retrieving data needed by workloads. In some embodiments, cache controller circuitry 110 is configured to switch to a non-default insertion policy to mitigate cache thrashing only if prefetch coverage does not meet a threshold, e.g., in addition to hit rates for the first cache and second cache meeting or not meeting certain thresholds.

In the illustrated embodiment, cache controller circuitry 110 is configured to track a pointer-chasing load metric determined by pointer-chasing load detection circuitry 250. In some embodiments, a pointer-chasing load is a particular class of load that depends on previous loads, e.g., an address of the present load is determined based on a result of another load. Pointer-chasing loads may be detected based on sources of loads tracked in reservation stations, as one example. Generally, pointer-chasing loads may indicate a workload that is more susceptible to thrashing.

In some embodiments, the pointer-chasing load performance metric may be a number of pointer-chasing loads over a time interval, a miss count for pointer-chasing loads, miss ratio for pointer-chasing loads, hit count for pointer-chasing loads, hit ratio for pointer-chasing loads, etc.

In some embodiments, in response to pointer-chasing load detection circuitry 250 detecting a miss count that meets a threshold for the class of pointer-chasing loads, cache controller circuitry 110 may increase the prefetch coverage threshold to take more aggressive action to mitigate cache thrashing.

In the illustrated embodiment, cache controller circuitry 110 is configured to track a store-miss performance metric based on operations by store circuitry 260. In some embodiments, stores follow a write-allocate policy for writes that miss in first cache 120, under which processor 100 allocates a block of memory in first cache 120 for a write that misses and retries the write. Generally, in situations where thrashing occurs, and where many stores are present, write-allocating stores to first cache 120 may increase thrashing.

In some embodiments, in response to store circuitry 260 detecting a store miss count that meets a threshold over a time interval, cache controller circuitry 110 is configured to convert subsequent stores from write-allocate to no a write-allocate policy for the first cache 120 such that stores bypass first cache 120 and may allocate in second cache 130 instead.

In some embodiments, various thresholds are dynamically adjustable based on one or more other performance metrics. Generally, various example metrics are described, but other metrics may be included in addition to or in place of the disclosed metrics. Further, multiple metrics may be logically combined, weighted, averaged over time, etc. to generate control signaling for a cache insertion policy. The disclosed combinations are included for purposes of explanation but are not intended to limit the scope of the present disclosure.

Example Cache Insertion Policy Scenarios

Figure 3:
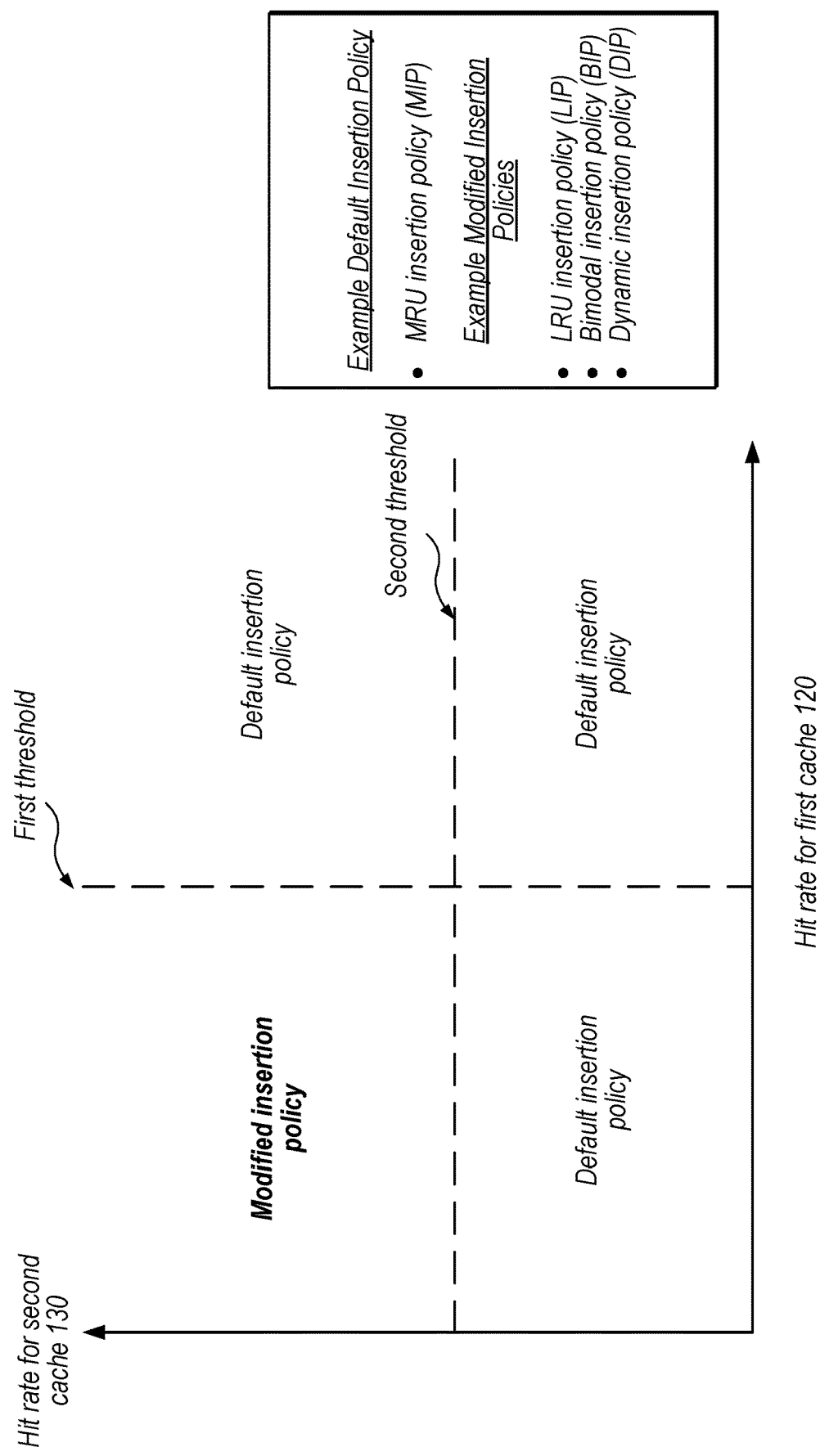
FIG. 3 is a diagram illustrating example insertion policy scenarios, according to some embodiments.

FIG. 3 is a diagram illustrating example insertion policy scenarios, according to some embodiments. In the illustrated embodiment, a hit rate for first cache circuit 120 and hit rate for second cache circuit 130 are tracked by cache controller circuitry 110 and used to select the cache insertion policy in various scenarios.

The hit rate for first cache 120 and hit rate for second cache 130 are non-limiting examples of the types of performance metrics that may be tracked and used to modify the cache insertion policy, and other metrics are also discussed in detail above. In some embodiments, other heuristics of the caches may be used in addition to the hit rate such as a prefetch coverage level, pointer-chasing load miss rate or a store miss count, for example.

In the illustrated embodiment, the cache controller circuitry 110 uses a default insertion policy (e.g., MRU insertion policy) in scenarios where the hit rate for the first cache 120 meets a first threshold and the hit rate for the second cache 130 does not meet a second threshold. When the hit rate for the second cache 130 meets the second threshold and the hit rate for the first cache 120 does not meet the first threshold, however, cache controller circuitry 110 selects a modified insertion policy (e.g., LRU insertion, bimodal insertion, or dynamic insertion policies).

In other embodiments, the default insertion policy used may be one of any number of insertion policies and the modified insertion policy is the MRU insertion policy.

In some embodiments, the first and second thresholds are dynamically adjustable based on one or more of the performance metrics. For example, the first and second thresholds may be dynamically adjusted based on a performance metric (e.g., prefetch coverage level) for first cache 120 meeting a third threshold.

Example Method

Figure 4:
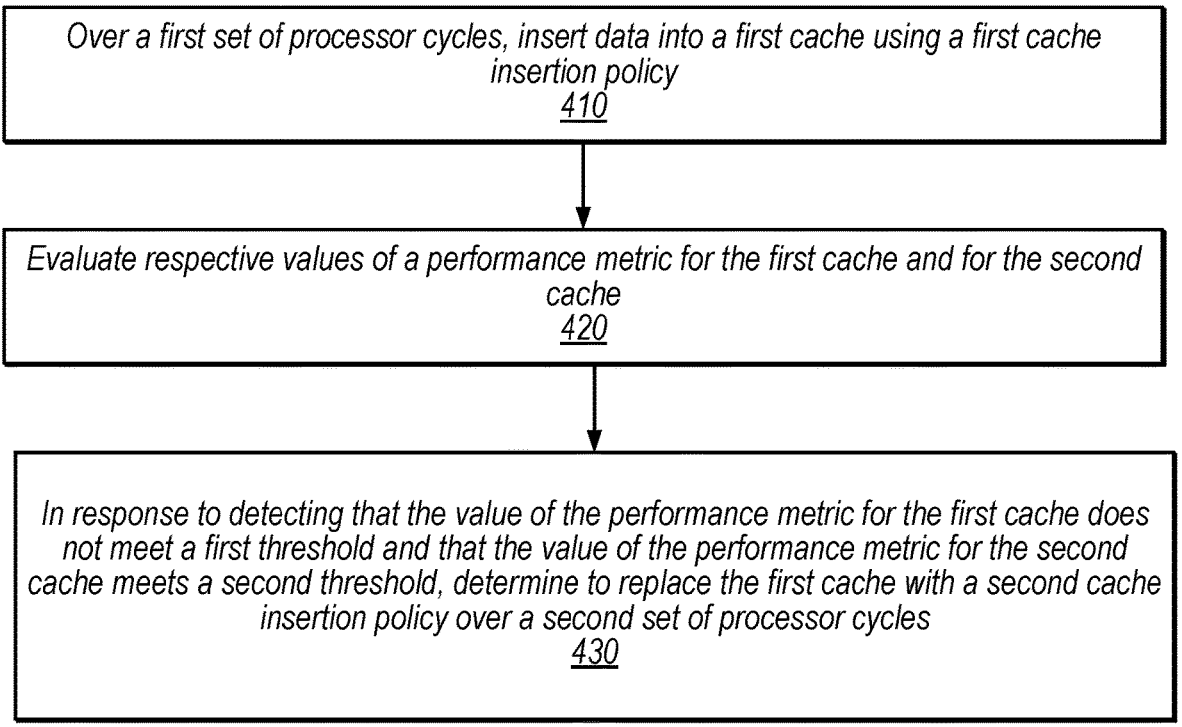
FIG. 4 is a flow diagram illustrating an example method for detecting cache thrashing, according to some embodiments.

FIG. 4 is a flow diagram illustrating an example method for detecting cache thrashing, according to some embodiments. The method shown in FIG. 4 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 410, in the illustrated embodiment, over a first set of processor cycles, cache controller circuitry (e.g., element 110) inserts data into a first cache using a first cache insertion policy. In some embodiments, the first cache insertion policy may be the MRU insertion policy, where all incoming lines are placed in the MRU position of the first cache. The MRU insertion policy is typically associated with the commonly used LRU replacement policy and is susceptible to thrashing for workloads that have a working set larger than the cache size.

In some embodiments, the first cache insertion policy is the LRU insertion policy, where all incoming lines are inserted in the LRU position of the first cache. In such embodiments, the LRU insertion policy offers thrash protection for workloads that have working sets greater than the cache size.

In other embodiments, the first cache insertion policy may be any number of insertion policies such as the bimodal insertion policy and the dynamic insertion policy, for example.

At 420, in the illustrated embodiment, cache controller circuitry evaluates respective values of a performance metric for the first cache and for the second cache. In some embodiments, the various performance metric values may include a hit count, hit ratio, miss count, miss ratio, prefetch coverage level, pointer-chasing load count, store miss count, evictions, cache occupancy, tag checks, etc.

In some embodiments, the performance metric values are provided for the first cache and the second cache to cache controller circuitry. In such embodiments, the performance metric values may be generated by the first and second caches themselves, or from other circuitry associated with the first and second caches such as prefetch circuitry, for example.

At 430, in the illustrated embodiment, in response to detecting that the value of the performance metric for the first cache does not meet a first threshold and that the value of the performance metric for the second cache meets a second threshold, cache controller circuitry determines to replace the first cache insertion policy with a second cache insertion policy over a second set of processor cycles.

In some embodiments, the performance metric for the first cache and the second cache may be a hit count, hit ratio, miss count, and miss ratio.

In some embodiments, the second cache insertion policy is any one of the MRU, LRU, bimodal, and dynamic insertion policies discussed above.

In some embodiments, cache controller circuitry may communicate with and receive, via prefetch circuitry, one or more prefetch coverage performance metrics for at least one of the first cache and the second cache. In some embodiments, the prefetch coverage performance metric represents the prefetch coverage level for a particular cache and is defined as the ratio of demand misses covered by prefetches from the prefetch circuitry over a time interval.

In some embodiments, pointer-chasing load detection circuitry is configured to detect pointer-chasing loads that occur and send performance metric information to the cache controller circuitry. In some embodiments, a pointer-chasing load is a particular class of load that depends on previous loads, e.g., the source operand of the present load is another load, and the sources of such loads may be logged by one or more reservation stations. In general, pointer-chasing loads are more susceptible to thrashing relative to other traditional instructions.

In some embodiments, store circuitry is configured to detect and track store misses. In some embodiments, stores follow a write-allocate policy, where a processor allocates a block of memory in a first level cache. Generally, in situations where thrashing occurs, and where many stores are present, write-allocating stores to a first level cache may cause further thrashing and lead to significant performance issues.

In some embodiments, in response to the store circuitry detecting a store miss count that meets a threshold over a time interval, subsequent stores are converted from write-allocate to no write-allocate and stores bypass a first-level cache, and a second-level cache is used instead.

In some embodiments, a third threshold for the first cache prefetch coverage level, a fourth threshold for a pointer-chasing load count, and a fifth threshold for a store miss count are evaluated against current performance metrics. In response to meeting the third, fourth, and fifth thresholds, in addition to the first and second thresholds, the first cache insertion policy is replaced with a second cache insertion policy over a second set of processor cycles.

In some embodiments, in response to detecting that the value of the performance metric (e.g., hit rate) for the first cache does not meet a first threshold, that the value of the performance metric for the second cache meets a second threshold, that the value of another performance metric for the first cache does not meet a third threshold, that the value of a performance metric for pointer-chasing load count meets a fourth threshold, and that the value of a performance metric for a store miss count meets a fifth threshold, the cache controller circuitry operates the first cache using a second cache insertion policy over a second set of processor cycles.

In some embodiments, in response to the pointer-chasing load detection circuitry detecting a miss count that meets a threshold for the class of pointer-chasing loads, the cache controller circuitry may adjust the prefetch coverage threshold, e.g., the third threshold.

In some embodiments, the first, second, third, fourth, and fifth thresholds may be dynamically adjustable based on one or more of the performance metrics.

In some embodiments, dedicated circuitry may be configured to detect pointer-chasing loads and a store miss count, among other performance metrics, in order to detect cache thrashing or conversely to detect when a current policy is working efficiently, e.g., to allow the system to adapt to different workload patterns.

Example Device

Figure 5:
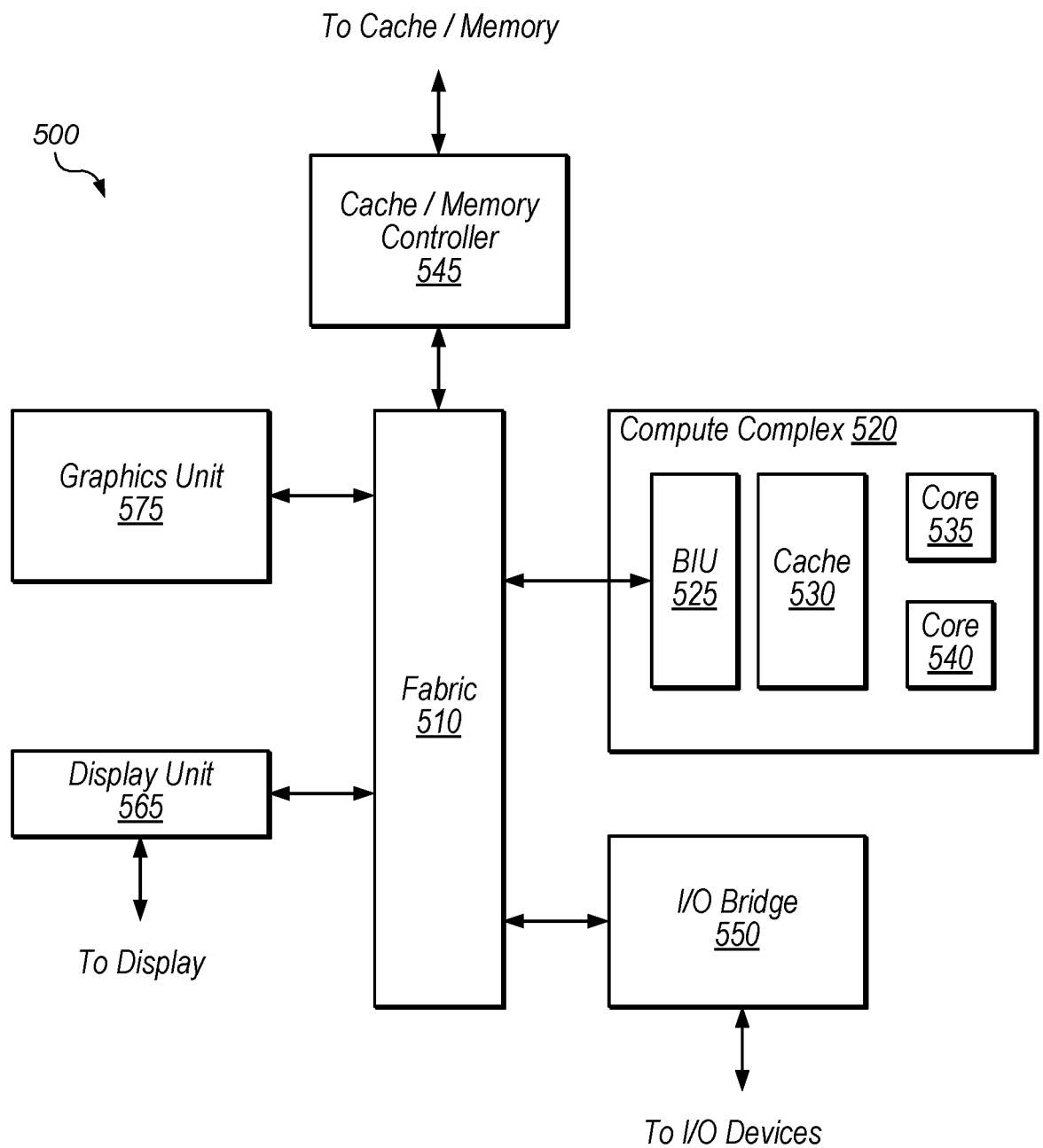
FIG. 5 is a block diagram illustrating an example computing device, according to some embodiments.

Referring now to FIG. 5, a block diagram illustrating an example embodiment of a device 500 is shown. In some embodiments, elements of device 500 may be included within a system on a chip. In some embodiments, device 500 may be included in a mobile device, which may be battery-powered. Therefore, power consumption by device 500 may be an important design consideration. In the illustrated embodiment, device 500 includes fabric 510, compute complex 520 input/output (I/O) bridge 550, cache/memory controller 545, graphics unit 575, and display unit 565. In some embodiments, device 500 may include other components (not shown) in addition to or in place of the illustrated components, such as video processor encoders and decoders, image processing or recognition elements, computer vision elements, etc.

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally.

In the illustrated embodiment, compute complex 520 includes bus interface unit (BIU) 525, cache 530, and cores 535 and 540. In various embodiments, compute complex 520 may include various numbers of processors, processor cores and caches. For example, compute complex 520 may include 1, 2, or 4 processor cores, or any other suitable number. In one embodiment, cache 530 is a set associative L2 cache. In some embodiments, cores 535 and 540 may include internal instruction and data caches. In some embodiments, a coherency unit (not shown) in fabric 510, cache 530, or elsewhere in device 500 may be configured to maintain coherency between various caches of device 500. BIU 525 may be configured to manage communication between compute complex 520 and other elements of device 500. Processor cores such as cores 535 and 540 may be configured to execute instructions of a particular instruction set architecture (ISA) which may include operating system instructions and user application instructions.

In various embodiments, disclosed techniques may improve performance, reduce power consumption, or both for caches utilized by compute complex 520.

Cache/memory controller 545 may be configured to manage transfer of data between fabric 510 and one or more caches and memories. For example, cache/memory controller 545 may be coupled to an L3 cache, which may in turn be coupled to a system memory. In other embodiments, cache/memory controller 545 may be directly coupled to a memory. In some embodiments, cache/memory controller 545 may include one or more internal caches.

As used herein, the term "coupled to" may indicate one or more connections between elements, and a coupling may include intervening elements. For example, in FIG. 5, graphics unit 575 may be described as "coupled to" a memory through fabric 510 and cache/memory controller 545. In contrast, in the illustrated embodiment of FIG. 5, graphics unit 575 is "directly coupled" to fabric 510 because there are no intervening elements.

Graphics unit 575 may include one or more processors, e.g., one or more graphics processing units (GPU's). Graphics unit 575 may receive graphics-oriented instructions, such as OPENGL®, Metal, or DIRECT3D® instructions, for example. Graphics unit 575 may execute specialized GPU instructions or perform other operations based on the received graphics-oriented instructions. Graphics unit 575 may generally be configured to process large blocks of data in parallel and may build images in a frame buffer for output to a display, which may be included in the device or may be a separate device. Graphics unit 575 may include transform, lighting, triangle, and rendering engines in one or more graphics processing pipelines. Graphics unit 575 may output pixel information for display images. Graphics unit 575, in various embodiments, may include programmable shader circuitry which may include highly parallel execution cores configured to execute graphics programs, which may include pixel tasks, vertex tasks, and compute tasks (which may or may not be graphics-related).

In various embodiments, disclosed techniques may improve performance, reduce power consumption, or both for caches utilized by graphics unit 575.

Display unit 565 may be configured to read data from a frame buffer and provide a stream of pixel values for display. Display unit 565 may be configured as a display pipeline in some embodiments. Additionally, display unit 565 may be configured to blend multiple frames to produce an output frame. Further, display unit 565 may include one or more interfaces (e.g., MIPI® or embedded display port (eDP)) for coupling to a user display (e.g., a touchscreen or an external display).

I/O bridge 550 may include various elements configured to implement: universal serial bus (USB) communications, security, audio, and low-power always-on functionality, for example. I/O bridge 550 may also include interfaces such as pulse-width modulation (PWM), general-purpose input/output (GPIO), serial peripheral interface (SPI), and inter-integrated circuit (I2C), for example. Various types of peripherals and devices may be coupled to device 500 via I/O bridge 550.

In some embodiments, device 500 includes network interface circuitry (not explicitly shown), which may be connected to fabric 510 or I/O bridge 550. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 500 with connectivity to various types of other devices and networks.

Example Applications

Figure 6:
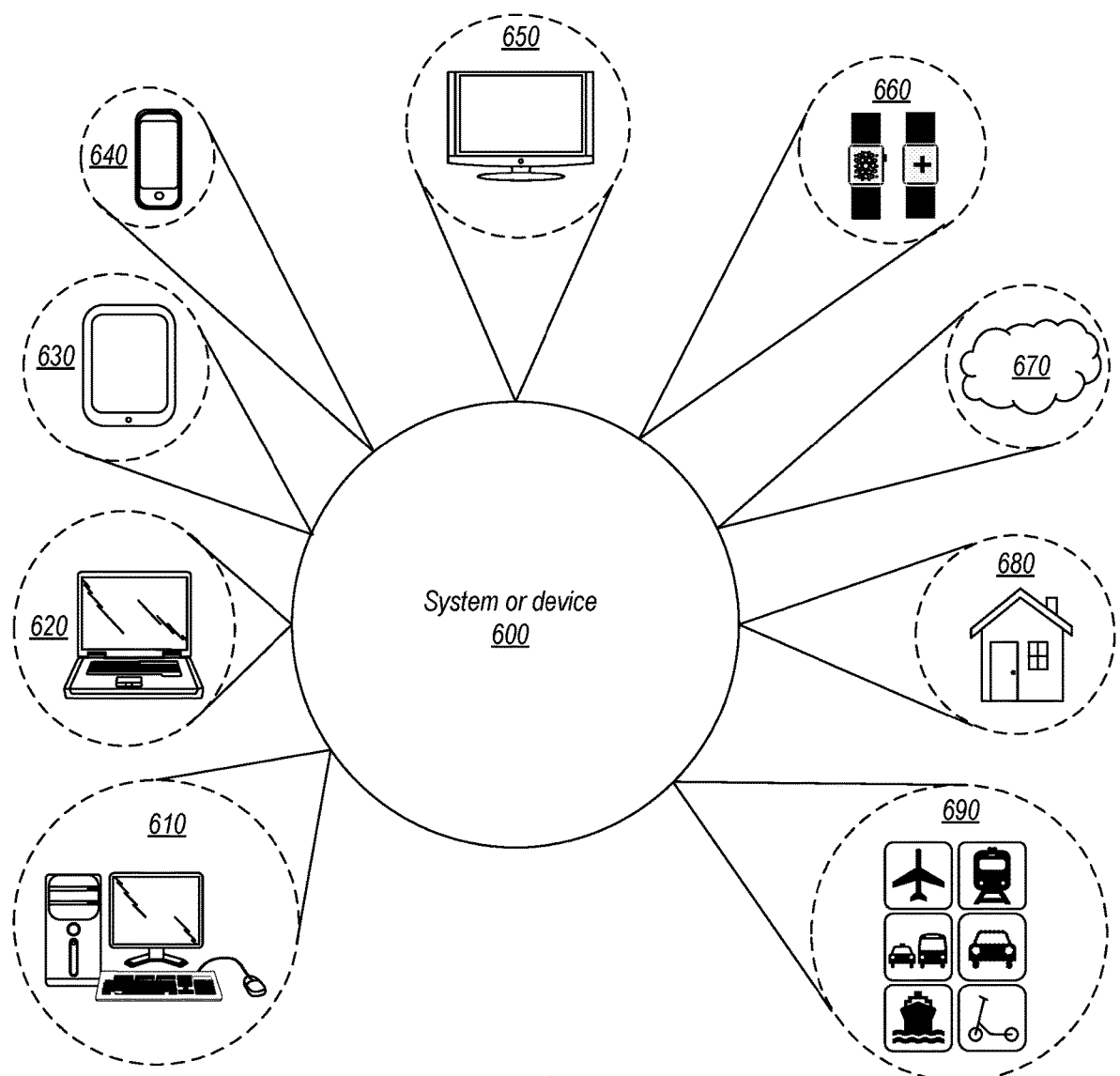
FIG. 6 is a diagram illustrating example applications of disclosed systems and devices, according to some embodiments.

Turning now to FIG. 6, various types of systems that may include any of the circuits, devices, or system discussed above. System or device 600, which may incorporate or otherwise utilize one or more of the techniques described herein, may be utilized in a wide range of areas. For example, system or device 600 may be utilized as part of the hardware of systems such as a desktop computer 610, laptop computer 620, tablet computer 630, cellular or mobile phone 640, or television 650 (or set-top box coupled to a television).

Similarly, disclosed elements may be utilized in a wearable device 660, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 600 may also be used in various other contexts. For example, system or device 600 may be utilized in the context of a server computer system, such as a dedicated server or on shared hardware that implements a cloud-based service 670. Still further, system or device 600 may be implemented in a wide range of specialized everyday devices, including devices 680 commonly found in the home such as refrigerators, thermostats, security cameras, etc. The interconnection of such devices is often referred to as the "Internet of Things" (IoT). Elements may also be implemented in various modes of transportation. For example, system or device 600 could be employed in the control systems, guidance systems, entertainment systems, etc. of various types of vehicles 690.

The applications illustrated in FIG. 6 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 7:
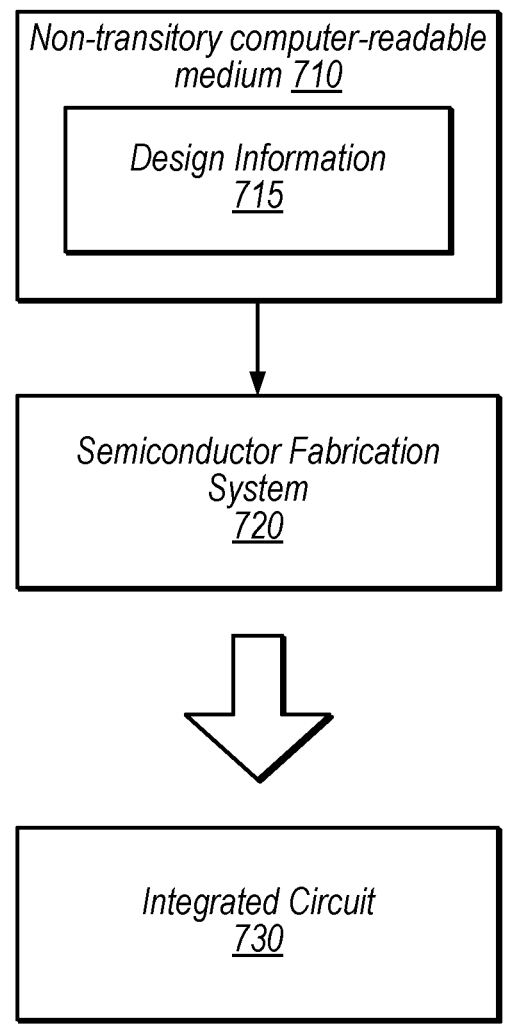
FIG. 7 is a block diagram illustrating an example computer-readable medium that stores circuit design information, according to some embodiments.

FIG. 7 is a block diagram illustrating an example non-transitory computer-readable storage medium that stores circuit design information, according to some embodiments. In the illustrated embodiment semiconductor fabrication system 720 is configured to process the design information 715 stored on non-transitory computer-readable medium 710 and fabricate integrated circuit 730 based on the design information 715.

Non-transitory computer-readable storage medium 710, may comprise any of various appropriate types of memory devices or storage devices. Non-transitory computer-readable storage medium 710 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 710 may include other types of non-transitory memory as well or combinations thereof. Non-transitory computer-readable storage medium 710 may include two or more memory mediums which may reside in different locations, e.g., in different computer systems that are connected over a network.

Design information 715 may be specified using any of various appropriate computer languages, including hardware description languages such as, without limitation: VHDL, Verilog, SystemC, SystemVerilog, RHDL, M, MyHDL, etc. Design information 715 may be usable by semiconductor fabrication system 720 to fabricate at least a portion of integrated circuit 730. The format of design information 715 may be recognized by at least one semiconductor fabrication system 720. In some embodiments, design information 715 may also include one or more cell libraries which specify the synthesis, layout, or both of integrated circuit 730. In some embodiments, the design information is specified in whole or in part in the form of a netlist that specifies cell library elements and their connectivity. Design information 715, taken alone, may or may not include sufficient information for fabrication of a corresponding integrated circuit. For example, design information 715 may specify the circuit elements to be fabricated but not their physical layout. In this case, design information 715 may need to be combined with layout information to actually fabricate the specified circuitry.

Integrated circuit 730 may, in various embodiments, include one or more custom macrocells, such as memories, analog or mixed-signal circuits, and the like. In such cases, design information 715 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 720 may also be configured to perform various testing of fabricated circuits for correct operation.

In various embodiments, integrated circuit 730 is configured to operate according to a circuit design specified by design information 715, which may include performing any of the functionality described herein. For example, integrated circuit 730 may include any of various elements shown in FIGS. 1, 2, and 5. Further, integrated circuit 730 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s)

of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
   first cache circuitry at a first level in a cache hierarchy;
   second cache circuitry at a second, different level in the cache hierarchy;
   one or more processors configured to execute program instructions that cause access to the first cache circuitry and the second cache circuitry;

cache controller circuitry configured to:
  over a first set of processor cycles, insert data into the first cache circuitry according to a first cache insertion policy;
  evaluate respective values of a performance metric for the first cache circuitry and for the second cache circuitry; and
  in response to detecting that the value of the performance metric for the first cache circuitry does not meet a first threshold and that the value of the performance metric for the second cache circuitry meets a second threshold, determine to replace the first cache insertion policy with a second cache insertion policy over a second set of processor cycles, wherein the second threshold is greater than the first threshold.

2. The apparatus of claim 1, wherein the performance metric indicates a hit ratio.

3. The apparatus of claim 1, wherein the cache controller circuitry is further configured to evaluate a prefetch coverage level for the first cache circuitry;
  wherein the determination to replace the first cache insertion policy with the second cache insertion policy over a second set of processor cycles is further based on determining that the prefetch coverage level does not meet a threshold.

4. The apparatus of claim 3, further comprising:
prefetch circuitry configured to prefetch data for the first cache circuitry and determine the prefetch coverage level for the first cache circuitry, wherein the prefetch coverage level is a ratio of demand misses covered by prefetches from the prefetch circuitry over a time interval.

5. The apparatus of claim 1, wherein the cache controller circuitry is further configured to evaluate pointer-chasing loads that access the first cache circuitry;
  wherein the determination to replace the first cache insertion policy with the second cache insertion policy over a second set of processor cycles is further based on detection of a pointer-chasing load metric meeting a threshold.

6. The apparatus of claim 1, where the cache controller circuitry is configured to adjust at least one of the first and second thresholds based on one or more other cache metrics.

7. The apparatus of claim 1, wherein the cache controller circuitry is further configured to evaluate a store performance metric and wherein the determination to replace the first cache insertion policy with the second cache insertion policy over a second set of processor cycles is further based on the store performance metric.

8. The apparatus of claim 7, wherein the store performance metric indicates a store miss rate or a store hit rate for the first cache circuitry.

9. The apparatus of claim 8, further comprising control circuitry configured to switch, for a set of one or more loads, from a policy that allows write allocation to a no write-allocate policy for the first cache circuitry based on the store performance metric.

10. The apparatus of claim 1, wherein the apparatus is a computing device that further includes:
  a display; and
  network interface circuitry.

11. A method, comprising:
  executing, by a computing system, program instructions that cause access to a first cache circuitry at a first level in a cache hierarchy and a second cache circuitry at a second, different level in the cache hierarchy;
  inserting, by the computing system, data into the first cache circuitry according to a first cache insertion policy over a first set of processor cycles;
  evaluating, by the computing system, respective values of a performance metric for the first cache circuitry and for the second cache circuitry; and
  in response to detecting that the value of the performance metric for the first cache circuitry does not meet a first threshold and that the value of the performance metric for the second cache circuitry meets a second threshold, the computing system determining to replace the first cache insertion policy with a second cache insertion policy over a second set of processor cycles, wherein the second threshold is greater than the first threshold.

12. The method of claim 11, wherein the performance metric indicates a hit ratio.

13. The method of claim 11, further comprising:
evaluating, by the computing system, a prefetch coverage level for the first cache circuitry;
  wherein the determining to replace the first cache insertion policy with the second cache insertion policy over the second set of processor cycles is further based on determining that the prefetch coverage level does not meet a threshold.

14. The method of claim 11, further comprising:
evaluating, by the computing system, pointer-chasing loads that access the first cache circuitry;
  wherein the determining to replace the first cache insertion policy with the second cache insertion policy over the second set of processor cycles is further based on detecting that a pointer-chasing load metric meets a threshold.

15. The method of claim 11, further comprising:
adjusting, by the computing system, at least one of the first and second thresholds based on one or more other cache metrics.

16. The method of claim 11, further comprising:
evaluating, by the computing system, a store performance metric, wherein the determining to replace the first cache insertion policy with the second cache insertion policy over the second set of processor cycles is further based on the store performance metric.

17. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
  first cache circuitry at a first level in a cache hierarchy;
  second cache circuitry at a second, different level in the cache hierarchy;
  one or more processors configured to execute program instructions that cause access to the first cache circuitry and the second cache circuitry;
  cache controller circuitry configured to:
    over a first set of processor cycles, insert data into the first cache circuitry according to a first cache insertion policy;
    evaluate respective values of a performance metric for the first cache circuitry and for the second cache circuitry; and
    in response to detecting that the value of the performance metric for the first cache circuitry does not meet a first threshold and that the value of the performance metric for the second cache circuitry meets a second threshold, determine to replace the first cache insertion policy with a second cache insertion policy over a second set of processor cycles, wherein the second threshold is greater than the first threshold.

18. The non-transitory computer readable medium of claim 17, wherein the cache controller circuitry is further configured to evaluate a prefetch coverage level for the first cache circuitry;
  wherein the determination to replace the first cache insertion policy with the second cache insertion policy over the second set of processor cycles is further based on determining that the prefetch coverage level does not meet a threshold.

19. The non-transitory computer readable medium of claim 17, wherein the cache controller circuitry is further configured to evaluate pointer-chasing loads that access the first cache circuitry;
  wherein the determination to replace the first cache insertion policy with the second cache insertion policy over the second set of processor cycles is further based on detection of a pointer-chasing load metric meeting a threshold.

20. The non-transitory computer readable medium of claim 17, wherein the cache controller circuitry is further configured to evaluate a store performance metric and wherein the determination to replace the first cache insertion policy with the second cache insertion policy over a second set of processor cycles is further based on the store performance metric.

\* \* \* \* \*